T. WHITEHEAD.
APPARATUS FOR RING SPINNING, DOUBLING, AND TWISTING MACHINERY.
APPLICATION FILED MAR. 1, 1920.

1,356,844.                                    Patented Oct. 26, 1920.

UNITED STATES PATENT OFFICE.

THOMAS WHITEHEAD, OF BLACKPOOL, ENGLAND.

APPARATUS FOR RING-SPINNING, DOUBLING, AND TWISTING MACHINERY.

1,356,844.  Specification of Letters Patent.  Patented Oct. 26, 1920.

Application filed March 1, 1920. Serial No. 362,216.

*To all whom it may concern:*

Be it known that I, THOMAS WHITEHEAD, a subject of the King of Great Britain, residing at 27 Gorse road, Blackpool, England, have invented certain new and useful Improvements in Apparatus for Ring-Spinning, Doubling, and Twisting Machinery, of which the following is a specification.

This invention relates to driving apparatus for ring spinning, doubling and twisting machinery and has for its object to provide an improved drive for the tin rollers, to make each spindle and carrier independent of each other, to reduce vibration of the spindle rails and to facilitate the adjustment of the spindles and carriers.

According to this invention four tin rollers or other driving drums are employed for two rows of spindles and carriers and toothed or friction wheels on two raising and lowering tin rollers intergear directly with one another and with two stationarily mounted tin rollers through the intervention of gearing arranged permanently in gear with the wheels on the tin rollers by means of links. To reduce vibration of the spindle or lifter rails, the rollers appertaining to such rails have no connection therewith but are mounted in a sliding frame to which an up and down motion is imparted by any appropriate mechanism, a cushioning device being applied to the bottom of the slide to diminish the blow on the central lifting arm caused by the high speed of the tin rollers.

In the accompanying drawings;—

Figure 1:
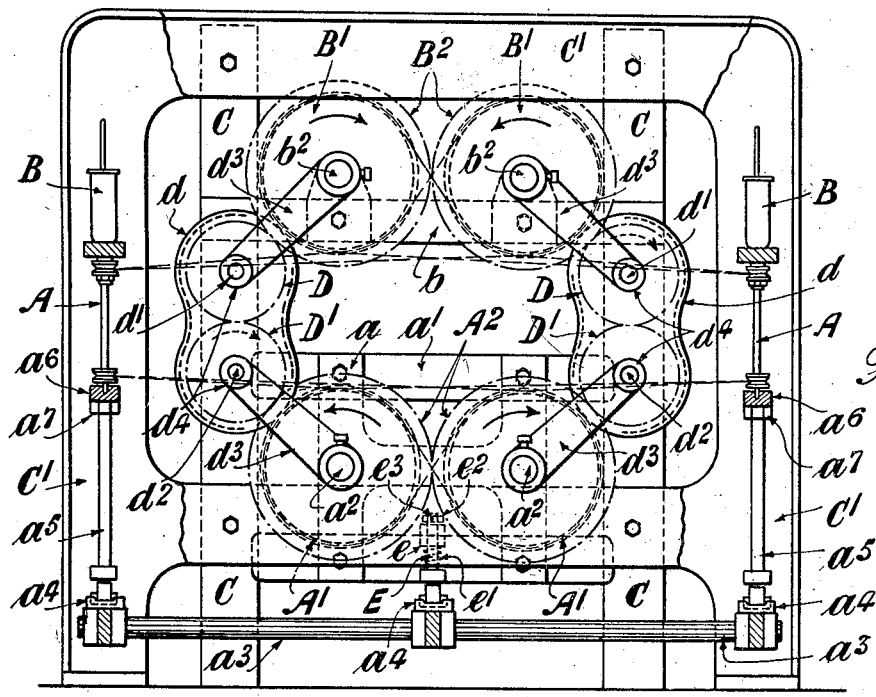
Figure 2:
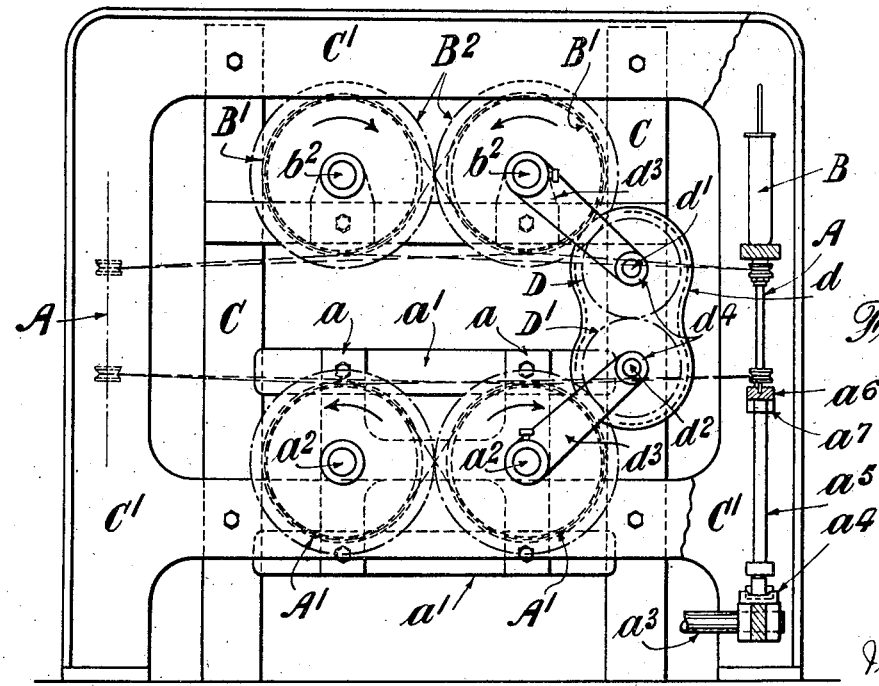

Figure 1 is an end view with one end frame partly broken away of a spinning frame provided with a compensating drive in accordance with this invention showing a method of mounting the rising and falling tin rollers, and Fig. 2 is a similar view showing a slightly modified drive.

A, A indicate the spindles, B, B the carriers, $A^1$ the tin rollers appertaining to the spindles and $B^1$ the tin rollers appertaining to the carriers. The rollers $A^1$ are mounted at each end in bearings on a movable frame $a^1$. The rollers $B^1$ are mounted at each end in bearings on a stationary rail $b$. The latter is bolted to upright frames C which are bolted to the frames $C^1$ of the machine. The movable frame $a^1$ is bolted to two cross frames $a$ which make a sliding fit with the uprights C. The tin rollers together with their supporting frames constitute a complete unit which can be applied to existing ring frames. The rollers $A^1$ may be geared direct to the existing frame shaft, or they may be driven by an electric motor. Motion is transmitted to each sliding frame by a lifting arm $a^2$ centrally disposed on a shaft $a^3$ carrying outer lifting arms $a^4$ which support the usual lifter rods $a^5$ appertaining to the spindle or lifter rails $a^6$. These arms $a^4$ are provided with counterbalance weights as usual and the bottom cross frames are advantageously provided with cushioning devices to diminish the blow, or vibration on the central lifting arms caused by the high speed of the rollers. In the example shown this cushioning device comprises a rod E slidably mounted in a bearing $e$ on each bottom cross frame and having a spring $e^1$ interposed between a head $e^2$ on the plunger and the aforesaid bearing, a pin $e^3$ or other appropriate device being employed for retaining the plunger in its bearing. Weights are used to counterbalance the weight of the sliding frames and rollers. Owing to the lifting rollers being mounted on a frame that is independent of the spindle rails the latter can be readily adjusted relatively to the rollers by the usual nuts $a^7$. The bottom rollers $A^1$ are provided with two intergearing wheels $A^2$, and the top rollers B, $B^1$ are provided with two intergearing wheels $B^2$. In the arrangement shown in Fig. 1 two pairs of intergearing wheels D, $D^1$ are mounted in brackets or guards $d$ $d$ having projecting studs $d^1$, $d^2$ to receive links $d^3$ which are retained in position on such studs by collars $d^4$ and are connected in like manner at their other ends to shafts $a^2$ and $B^2$ respectively which appertain to the bottom tin rollers. The links $d^3$ are of such a length as to permanently retain the wheels D, $D^1$ in gear with the wheels on the top and bottom rollers. By this arrangement when motion is imparted to one of the top rollers from any convenient source of power a continuous drive is transmitted to all the other rollers which is not affected in any way by the lifting and lowering of the bottom rollers, the intergearing pairs of wheels D, $D^1$ swinging out or in on their respective links as the bottom rollers are lifted or lowered. The various intergearing wheels may drive through frictional contact or through suitable teeth. In the modification shown in Fig. 2, the left hand pair of intergearing wheels is dispensed with.

What I claim as my invention and desire to secure by Letters Patent of the United States is:—

1. In ring spinning, doubling and twisting machinery, the combination of two stationarily mounted driving drums, two rising and falling driving drums intergearing directly with one another and link supported gearing arranged permanently in gear with the stationarily and movably mounted drums.

2. In ring spinning, doubling and twisting machinery, the combination of two stationarily mounted driving drums intergearing directly with one another, two rising and falling driving drums intergearing directly with one another and link supported gearing arranged permanently in gear with the stationarily and movably mounted drums.

3. In ring spinning, doubling and twisting machinery, the combination of two driving drums mounted at each end in bearings on a rail connected to two uprights adapted to be bolted to the machine frame, two intergearing driving drums mounted at each end in bearings on a frame that is slidable on the said uprights and link supported gearing arranged permanently in gear with the stationarily and movably mounted drums.

4. In ring spinning, doubling and twisting machinery, the combination of two driving drums mounted at each end in bearings on a rail connected to two uprights adapted to be bolted to the machine frame, two intergearing driving drums mounted at each end in bearings on a frame that is slidable on the said uprights, link supported gearing arranged permanently in gear with the stationarily and movably mounted drums, a lifting arm for moving the slidable frame and a cushioning device interposed between the lifting arm and the rising and falling rollers.

In testimony whereof I affix my signature in presence of two witnesses.

THOMAS WHITEHEAD.

Witnesses:
GEORGE H. LEWIS,
JOHN COWELL.